US008140538B2

(12) United States Patent
Korupolu et al.

(10) Patent No.: US 8,140,538 B2
(45) Date of Patent: Mar. 20, 2012

(54) SYSTEM AND METHOD OF DATA CACHING FOR COMPLIANCE STORAGE SYSTEMS WITH KEYWORD QUERY BASED ACCESS

(75) Inventors: Madhukar R. Korupolu, Sunnyvale, CA (US); Soumyadeb Mitra, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 12/104,711

(22) Filed: Apr. 17, 2008

(65) Prior Publication Data

US 2009/0265329 A1 Oct. 22, 2009

(51) Int. Cl.
*G06F 7/00* (2006.01)
*G06F 17/30* (2006.01)

(52) U.S. Cl. ........................................ 707/748; 707/723

(58) Field of Classification Search .................. 707/748, 707/723

See application file for complete search history.

(56) References Cited

U.S. PATENT DOCUMENTS 5,915,249 A * 6/1999 Spencer ........................ 707/742
6,947,935 B1 * 9/2005 Horvitz et al. ........................ 1/1
2001/0011293 A1 * 8/2001 Murakami et al. ............ 709/201
2002/0103793 A1 8/2002 Koller et al.
2005/0138015 A1 6/2005 Dageville et al.
2005/0144162 A1 * 6/2005 Liang ................................ 707/3
2006/0047636 A1 3/2006 Mohania et al.
2007/0118521 A1 5/2007 Jatowt et al.
2007/0192300 A1 8/2007 Reuther et al.
2007/0208690 A1 9/2007 Schneider et al.
2007/0214109 A1 9/2007 Doyle et al.
2007/0250468 A1 10/2007 Pieper
2008/0059492 A1 * 3/2008 Tarin ............................ 707/100
2008/0172422 A1 * 7/2008 Li et al. ......................... 707/202

OTHER PUBLICATIONS

Sahni, Sartaj. "Approximate Solutions for the 0/1 Knapsack Problem." ACM vol. 22, No. 1, 1975, pp. 115-124.*
Soo-Yong Jeon et al., Energy-Efficient Caching Strategy Using Probability-based Data Request for Mobile Environments, 2005 IEEE, 5 pages, (KAIST).
Yigal Arens et al., Intelligent Caching: Selecting, Representing, and Reusing Data in an Information Server, 1994 ACM, pp. 433-438, University of Souther California.
Patricia Correia Saraiva et al., Rank-Preserving Two-Level Caching for Scalable Search Engines, 2001 ACM, pp. 51-58, New Orleans, Louisiana, USA.

* cited by examiner

*Primary Examiner* — Charles Lu
(74) *Attorney, Agent, or Firm* — GSS Law Group

(57) ABSTRACT

A method of data caching for compliance and storage systems that provide keyword search query based access to documents computes a value for each data document based on a document information-retrieval relevancy metric for user keyword queries and a recency, frequency of each query. The values are adapted to changing query frequencies and popularities. Then selecting and evicting documents from a cache can be based on the values according to a knapsack solution. A weight is computed for each query such that recent, more frequent queries get a higher weight. A information-retrieval metric is used for measuring a relevancy of a document for a query. A weighted sum is taken of the information-retrieval metric times a query weight over all queries.

7 Claims, 1 Drawing Sheet new query
200
update FIFO, Qw, Dw 202
204 in cache ?
no
208 fetch doc
210 calc Qw, Dw
212 evict
return
yes
206 return doc
return

SYSTEM AND METHOD OF DATA CACHING FOR COMPLIANCE STORAGE SYSTEMS WITH KEYWORD QUERY BASED ACCESS

FIELD OF THE PRESENT INVENTION

The present invention relates to data caching, and in particular to data caching for compliance and storage systems that provide keyword search query based access to documents.

BACKGROUND

Businesses are increasing generating and storing an large amounts of email, instant messages, audit logs, financial records, and other digital information. In 2006, businesses sent over 3.5 exabytes of email, more than four times the amount in 2004. Such records are valuable assets, and needed for key business operation decisions. They are increasing used as well in internal, regulatory, and litigatory investigations. The retention and maintenance of electronic records is now being mandated by government regulations, e.g., the Sarbanes-Oxley Act, and SEC Rule 17a-4.

Compliance record workloads are quite different from traditional file system or database workloads. For example, compliance records are very likely not going to be queried until years later, and by others than their original creators. As a result, search based lookups considered to be the only feasible way to access such records. Conventional file systems and database workloads use direct metadata based, pathname, or exact query lookups through a SQL query. The differences in the best access methods to use changes how best to store and retrieve such records.

The natural query interface for semi-structured or unstructured business records such as email, memos, notes and reports is keyword search. In a keyword query, the user provides a list of keywords and receives an ordered list of some K documents judged to be the most relevant for that keyword query. Search engines also display a document abstract, which includes the owner, creation time, some keywords, document header etc with each document in the ranked list. The user accesses some of the documents in the top-K list which they think are relevant to their information needs, before reformulating their query or exiting the session if they are satisfied. In a keyword search based access, documents which do not appear in the top-K of the query result are unlikely to be accessed through the query.

Traditional data caching schemes are based on heuristic models of data access. For example, temporal locality models assume that any data block accessed once are likely to be accessed again in near future, and so are good items to be cached. Least recently used (LRU) caching exploits this temporal locality access model by caching records in the order of their recency of access.

A compliance record workloads is also likely to exhibit locality in document accesses and can benefit from caching. For example, keyword queries often exhibit strong locality. After entering a query, users are very likely to reformulate and enter another related query. Reformulated queries are often very similar to the original queries, give or take a few keywords. So, there is likely to be a substantial overlap in the relevant sets of the queries.

Locality is also exhibited across users in the form of popular queries. There is however, a subtle difference between query locality and document access locality. If a user accesses documents ranked first and fifth in one query execution, this does not imply that those documents are more likely to be accessed as compared to documents ranked say second and third in future executions of a related query, by the same user or the same query, or by different users. A user is less likely to access an already clicked document after moving on to a related query. Different users access different documents when the keyword query only approximates a user's document access needs. Different users might not judge the returned documents as relevant for the same query. When a query is run, the caching priority of all the documents relevant for that query should boost up, weighted by the relevance of the document for the query. A simple LRU scheme would only consider the documents actually accessed by the user.

SUMMARY OF THE PRESENT INVENTION

A method of data caching for compliance and storage systems that can provide keyword search query based access to documents computes a value for each data document based on a document information-retrieval relevancy metric for user keyword queries and a recency, frequency of each query. The values are adapted to changing query frequencies and popularities. Then the selecting and evicting documents from a cache can be based on the values according to a knapsack solution. A weight is computed for each query such that recent, more frequent queries get a higher weight. A information-retrieval metric is used for measuring a relevancy of a document for a query. A weighted sum is taken of the information-retrieval metric times a query weight over all queries.

The above summary of the invention is not intended to represent each disclosed embodiment, or every aspect, of the invention. Other aspects and example embodiments are provided in the figures and the detailed description that follow.

BRIEF DESCRIPTION OF THE DRAWINGS

The present invention may be more completely understood in consideration of the following detailed description of various embodiments of the invention in connection with the accompanying drawings, in which.

Figure 1:
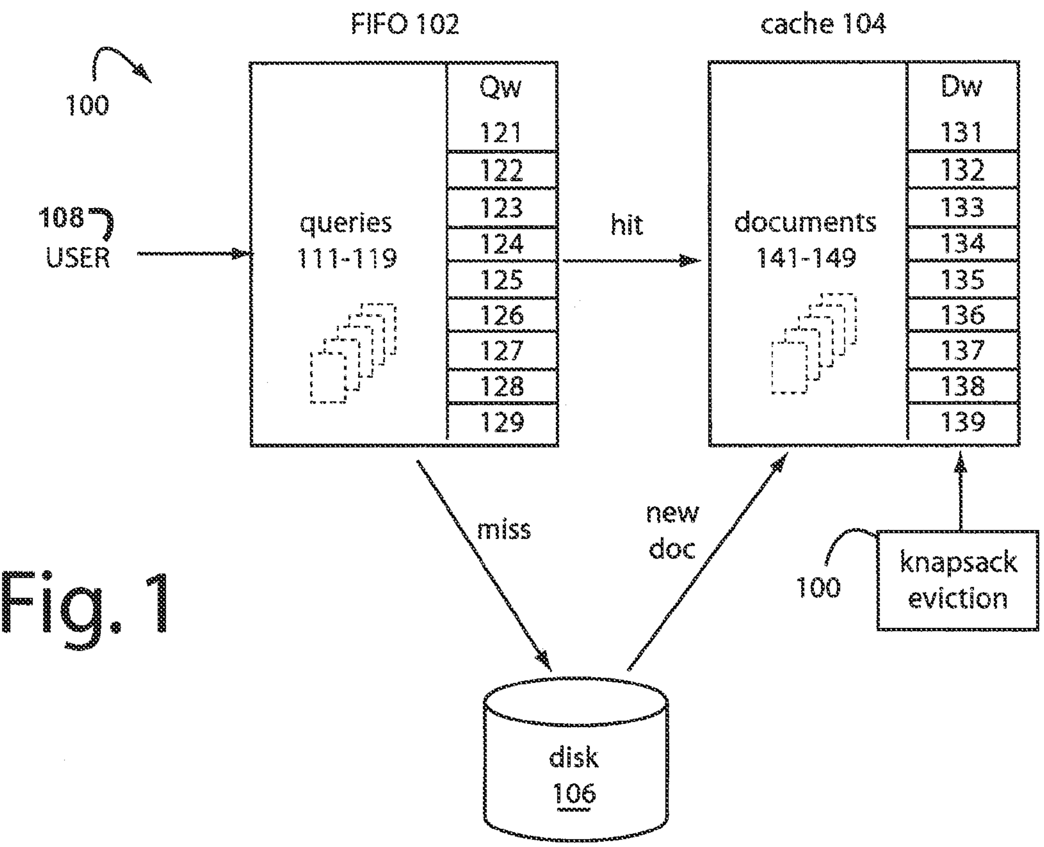
FIG. 1 is a functional block diagram of a document search system embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In FIG. 1, a document search system 100 maintains a query history 111-119 in a first-in first-out (FIFO) queue 102 of recent database queries. A cache 104 stages documents that are expected to be needed again soon from a disk storage 106. A most recent query from a user 108, e.g., 111, is placed on top of the queue and a least recent query, e.g., 119, on the bottom. Each query in the query history FIFO 102 is assigned a weight 121-129 based on its position in the queue. Such weights model the probability of the query or a related query being invoked again. Recently invoked queries, at the top of the queue in FIFO 102, are more likely to be invoked or followed up, and are assigned greater weights than queries at the tail of the query history FIFO 102.

A weight 131-139 is maintained for each document 141-149 in cache 104, and such weight models the probability of the particular document being accessed again through a query, wherein such weight is based on a relevance of the document for queries in a query history.

When a user 108 enters a new query 111-119, the query history FIFO 102, and the query and document weights 121-129 and 131-139 are updated. When a document 141-149 in a result set is selected, the document is returned to the user if it was already in the cache 104. The document and query weights are not changed. But, if the document was not in the cache, it is fetched from the database 106 and its document weight is calculated. Such calculation requires iterating over all the queries 111-119 in the query history FIFO 102 because the document may be relevant to other items there. An existing document 141-149 will probably need to be evicted from the cache to make room.

The cache is limited in how much it can keep, and is treated as a "knapsack" problem. The knapsack elements, e.g., documents, have weights and sizes. Only so much will fit inside. The goal in the knapsack problem is to pack those documents into the knapsack which result in the most efficient use of the total weight and size limits. Any knapsack heuristic could be used, e.g., packing elements in the order of weight to size ratio, highest to smallest. The documents with the smallest weight to size ratio will be evicted first.

Figure 2:
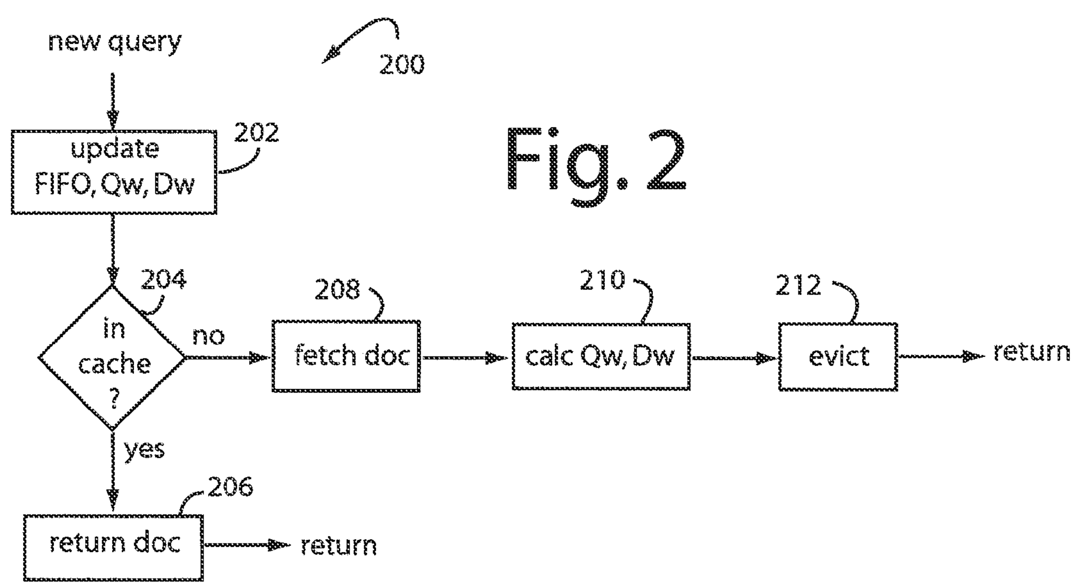
FIG. 2 is a flowchart diagram of a document search method or computer program for a disk storage system, such as in FIG. 1.

FIG. 2 represents a method 200 that can be used with system 100 of FIG. 1. Method 200 begins with a new query from a user. This causes a step 202 to update the query history FIFO queue 102, query weights 121-129, and document weights 131-139. A step 204 checks to see if the document that satisfies the query is already in the cache 104. If yes, a document 141-149 is returned to the user in a step 206. Otherwise, a new document is fetched in a step 208 from disk 106 to be placed in cache 104 and provided to the user. A step 210 calculates the effects of cache miss, and updates query weights 121-129 and document weights 131-139. The new document will need to have room in cache 104, and this usually means something else has to be evicted. A step 212 uses a knapsack algorithm to decide which documents 141-149 to evict, and then evicts them. The decision of which to evict depends on the documents' associated weights 131-139. A next new query can then be handled.

Herein, p(d|q), is the probability that a user will consider a document d relevant for a query q and will access it. The probability is the fraction of times the document d is accessed in multiple executions of q, possibly by different users. Because the query is only an approximation of the user's information needs, different users may judge other documents to be relevant for the same query. Consider a set of queries Q, and assume that queries arrive from this set following a distribution p: p(q) is the probability of the next query being q. The probability p(d) of a document d being accessed in a query selected from this distribution is, $$p(d) = \sum_{q \in Q} p(d \mid q) * p(q)$$

The p(d) value models the probability of the document being accessed if queries follow the distribution p. The documents are cached in the decreasing order of the p(d) values.

To evaluate the document weights, we need the query distribution p(q) and document-query relevance measure p(d|q). We discuss this in the next section. Model for p(q) A history of the recently seen queries can be a good predictor of future queries. As explained above, users indeed follow up queries with related queries. Similarly, popular queries occur frequently and hence can be captured through a query history.

A history of recent queries is maintained in a FIFO. Recency is incorporated in the model by assigning weights to the queries based on their position in the FIFO. One simple model is to assign linear weights as, $$p(q)=c_1*pos(q)$$

where pos(q) is the position of the query q in the FIFO. The most recent entry has the position value N, where N is the number of entries in the FIFO. Such weight model considerably simplifies the weight update step when a new query is inserted into the FIFO.

We also propose to evaluate alternative models of query weights, e.g. an exponential model, $$p(q)=c_e+c f^{pos(q)}.$$

In weight based models, one option is to model p(d|q) as, $$p(d \mid q) = \frac{C_N * W(d, q)}{|q|},$$

where W is the weight of a match between a document d and a query q, as per some IR model like TFIDF score. Intuitively, the weight W(d, q) captures the extent of the match between the document d and the query q, and hence indicates the likeliness of the user considering that relevant for the query. For multi-term queries, we normalize the weight by the query length. cN is a normalization constant.

In rank based models, the click-through probability p(d|q) can be estimated if the set of documents previously clicked on for q is known. The click through information for the three hundred most popular queries in an IBM intranet search engine workload was examined. The p(d|q) for such queries can be well approximated as a function of the rank of document d, in a query result for q. For example, the top one or two documents are almost always accessed, and documents beyond the top twenty are only rarely accessed. Similar results have been obtained in a previous click-through studies.

For each query q, a set of documents $q_d$ is maintained that are relevant for that query. If $q_d$ is very large, we can truncate qd to store some top-K documents. The rank based model for p(d|q) proposed earlier automatically truncates this to the top 20 documents. We can use any data-structure like a hash table etc to store these documents.

In updating query weights, when a new query $q_{new}$ is invoked, the weights of all queries in the query FIFO: q∈Q, $q \neq q_{new}$ are decremented. In the linear weight case, the weights decrement by cl. In the exponential weight model, the weights become a fraction, $$\left(\frac{1}{c_{e2}}\right),$$

of their original weights. Then, $q_{new}$'s weight is set to the weight corresponding to the top FIFO element. And, the query history FIFO is updated. If qnew is a new query, e.g., it was not present in the history, the last query, $q_{evc}$, in the FIFO must be evicted.

The document weights must be updated if the query weights change, $$p(d) = \sum_{q \in Q} p(d \mid q) * w(q)$$

where c is a constant, incorporating all the constant multipliers. Suppose a query $q_{new}$ is executed, and $q_{new}$ is already present in the query history Q. The new document weight in this case would be, $$p'(d) = c * \sum_{q \in Q} p(d \mid q) * w'(q),$$

where w' are the new query weights. In the linear model, the new weights are $$w'(q) = w(q) - c_l q \in Q - \{q_{new}\}$$

$$w'(q_{new}) = \text{weight-top}$$

where, weight-top is the weight of the top element in the query history FIFO.

The new weight of a document d, omitting the constant c for ease of presentation, is, $$p'(d) = \sum_{q \in Q - \{q_{new}\}} p(d \mid q) * (w(q) - c_l) + p(d \mid q_{new}) * w'(q_{new})$$

$$p'(d) = \sum_{q \in Q} p(d \mid q) * w(q) - c_l \sum_{q \in Q} p(d \mid q) + p(d \mid q_{new}) * (w'(q_{new}) - w(q_{new}) + c_l)$$

$$p'(d) = p(d) = c_l \sum_{q \in Q} p(d \mid q) + p(d \mid q_{new}) * (w'(q_{new}) * (w'(q_{new}) - w(q_{new}) + c_l)$$

The second term, $$\sum_{q \in Q} p(d \mid q),$$

can be maintained for each document in the cache. It is updated whenever the query history changes. This step is 0(1), per document per query execution, since in any step the query history changes by at-most two queries, one new query and one expired query. The total update cost is $O(n_d)$, where $n_d$ is the number of documents in the cache.

Now consider the case where $q_{new}$ is a new query, e.g., it was not present in the cache. Getting this query would result in a query $q_{evc}$ being evicted from the cache. The new document weights in this case, $$p'(d) = \sum_{q \in Q - \{q_{eve}\}} p(d \mid q) + (w(q) - c_l) - p(d \mid q_{eve}) * w(q_{new}) + p(d \mid q_{new}) * w'(q_{new})$$

Which can be simplified to, $$p'(d) = p(d) - c_l \sum_{q \in Q} p(d \mid q) - p(d \mid q_{eve}) * (2w(q_{eve}) - c_l) + p(d \mid q_{new}) * w'(q_{new})$$

Again, $$\sum_{q \in Q} p(d \mid q)$$

is maintained for each document. The weight update step is 0(1). For the exponential model for w(q), the weights can be derived as follows. In the case where the new query $q_{new}$ is already present in the query history. The new document weight in this case is $$p'(d) = \sum_{q \in Q} p(d \mid q) w'(q)$$

where w' is $$w'(q) = w(q)/c_l q \in Q - \{q_{new}\}$$

$$w'(q_{new}) = \text{weight-top}$$

weight-top is the weight of the top element in the query history FIFO.

Omitting the constant c for ease of presentation, the new weight of a document d is $O(n_d)$, where $n_d$ is the number of documents in the cache.

$$p'(d) = \sum_{q \in Q - \{q_{new}\}} p(d \mid q) * \frac{w(q)}{c_l} + p(d \mid q_{new}) * w'(q_{new})$$

$$p'(d) = \frac{1}{c_l} \sum_{q \in Q} p(d \mid q) * w(q) + p(d \mid q_{new}) * \left(w'(q_{new}) - \frac{w(q_{new})}{c_l}\right)$$

$$p'(d) = \frac{p(d)}{c_l} + p(d \mid q_{new}) * \left(w'(q_{new}) - \frac{w(q_{new})}{c_l}\right)$$

This step is 0(1) per document. The total update cost is $O(n_d)$, where $n_d$ is the number of documents in the cache.

If $q_{new}$ is a new query, not present in the cache, then a query $q_{evc}$ must be evicted from the cache to make room. The new document weights are $$p'(d) = \sum_{q \in Q - \{q_{new}\}} p(d \mid q) * \frac{w(q)}{c_l} - p(d \mid q_{evc}) * w(q_{evc}) + (d \mid q_{new}) * w'(q_{new})$$

It can be simplified to $$p'(d) = \frac{p(q)}{c_l} - p(d \mid q_{evc}) * w(q_{evc})\left(1 + \frac{1}{c_l}\right) + p(d \mid q_{new}) * w'(q_{new}).$$

This can be computed in 0(1), wherein the number of each kind of item in a knapsack problem is restricted to zero or one. The weight update step is a 0(1) knapsack problem.

Taking a last document access into consideration, the probability of a document being accessed through a query q also depends on the other documents that the user accessed through that query. For example, if a user accessed the document ranked $99^{th}$, the chances of them accessing the $100^{th}$ document is much higher, as compared to the case where they just accessed the $1^{st}$ document. Keeping track of all the document accesses for all the queries, however, can be prohibitive. So it is assumed that the user clicks through documents in order of their rank to the user. The last document that was accessed for every query is tracked. For each q, $q \in Q$, let $d_q$ be the document that was last accessed by the user through that query. For any document, d, the probability of it being accessed can be estimated, given that the last access for that query was to document $d_q$, $$p(d \mid q, d_q) = \frac{p(d, d \mid q)}{p(d_q \mid q, d_q)}.$$

Assuming that users access their documents in order, if a user accesses d, then they can be assumed to have accessed $d_q$. So, $p(d, d_q|q)=p(d|q)$. Therefore, $$p(d \mid q, d_q) = \frac{p(d \mid q)}{p(d_q \mid q)}.$$

For this enhancement, the last document accesses must be tracked for each query. The search engine is assumed to keep track of this information through session ID's. In this case, a document access can change the weights of other documents, unlike the previous case where only queries could change the document weights. Such is not complex. The documents which are relevant for a query are already being tracked. The weights of all such documents must be updated.

If a document is accessed directly, e.g., not through any query interface, it can be thought of as being accessed by a "special" query which matches only one document. Its weight can be calculated and updated appropriately. Direct accesses can be accommodated under the same framework as those for query based accesses.

In general, the query results are assigned weighted values that are used later to calculate the relevance of the results based on a query history. The query results can be cached in the form of a knapsack which will allow the organization of the packed elements to be ordered in the form of a weight to size ratio which is highest to smallest and eliminating the least relevant results. Furthermore, the method creates a scheme for data caching which provides search results based on access method that have a likelihood of appearing in a query result.

Stated another way, a method of data caching for compliance and storage systems that can provide keyword search query based access to documents computes a value for each data document based on a document information-retrieval relevancy metric for user keyword queries and a recency, frequency of each query. The values are adapted to changing query frequencies and popularities. Then the selecting and evicting of documents from a cache can be based on the values according to a knapsack solution. A weight is computed for each query such that recent, more frequent queries get a higher weight. A information-retrieval metric is used for measuring a relevancy of a document for a query. A weighted sum is taken of the information-retrieval metric times a query weight over all queries.

While the invention has been described with reference to several particular example embodiments, those skilled in the art will recognize that many changes may be made thereto without departing from the spirit and scope of the invention, which is set forth in the following claims.

The invention claimed is:

1. A method of data caching for compliance and storage systems that provides keyword search query based access to documents, the method comprising:

searching documents from a storage device by a keyword based interface;

staging from a cache documents that are read and that are expected to be needed again from the storage device;

computing a document weight for each of the documents read and expected to be needed again, wherein the document weight is based on a document information retrieval (IR) relevancy metric for user keyword queries and a recency and a frequency of each query and the document weight models a probability of a particular document being accessed again through a query, and wherein the document weight is based on a relevance of each document for queries in a query history;

placing a processor and a disk in data communication with a First In First Out queue and a cache; and if the document being accessed again was not already in the cache, evicting another document from the cache to make room for the document being accessed again to be placed in the cache by packing elements in the order of a document weight-to-size ratio, highest to smallest, and evicting documents with a smallest document weight-to-size ratio first;

maintaining a query history of recent queries from a user in a query history first-in first-out queue;

assigning each query from a user a query weight based on a position of the query from a user in the First In First Out queue, wherein the query weight models a probability of a query or a related query being invoked again;

wherein each one of the document weight is recomputed by the processor when a document to be retrieved was not previously cached;

updating the query history First-in First-Out queue and each of the document weights when a new query has been entered;

adapting each of the document weights to changing query frequencies and popularities; and selecting and evicting documents from the cache according to a knapsack solution.

2. The method of claim 1, wherein the computing of said value for each data document further comprises:

computing a higher document weight for recent queries;

computing a higher document weight for more frequent queries;

computing a information-retrieval (IR) metric measuring a relevancy of a document for a query; and taking a weighted sum of the IR metric times a query weight over all queries.

3. The method of claim 1, wherein if all document sizes are the same, the ordering is done according to cached values of said document weight.

4. The method of claim 1, further comprising: allowing direct document accesses to be interspersed between keyword query accesses; and calculating a document weight for a direct access as a query which matches only one document.

5. A document search system, comprising:

a keyword based interface that searches documents from a storage device;

a cache that stages documents that are read and that are expected to be needed again from said storage device, wherein said cache further includes a document weight that is maintained for each document, said document weight models a probability of a particular document being accessed again through a query, said document weight is based on a relevance of each document for queries in a query history, and if said document being accessed again was not already in said cache, another document is evicted from said cache to make room for said document being accessed again to be placed in said cache by packing elements in the order of a document weight-to-size ratio, highest to smallest, and documents with a smallest document weight-to-size ratio are evicted first;

a query history first-in first-out (FIFO) queue that maintains a query history of recent queries from a user, wherein, each query is assigned a query weight based on its position in said FIFO queue, wherein the query weight models a probability of a query or a related query being invoked again;

a processor connected to said query history FIFO queue, wherein said processor computes a value for each data document based on a document information retrieval (IR) relevancy metric for user keyword queries and a recency and a frequency of each query, and said processor recomputes each one of said document weight (Dw) for each data document when a document to be retrieved was not previously cached;

an updating system that updates said query history FIFO queue, each of said query weight, and each of said document weight when a new query has been entered;

a mechanism that adapts each one of said document weight for each data document to changing query frequencies and popularities; and a mechanism selecting and evicting documents from said cache based on said document weight for each data document according to a knapsack solution.

6. The document search system of claim 5, wherein if a document selected from a result set was not already in said cache, said document selected from a result set will be fetched from a storage system and a document weight for said document selected from a result set and not already in the cache is calculated by iterating over all queries then in said query history FIFO queue.

7. The document search system of claim 5, wherein: if said document being accessed again was not already in said cache, another document is evicted from said cache to make room for said document being accessed again to be placed in said cache according to a 0(1) knapsack computation.

* * * * *